United States Patent
Zhidkov

(10) Patent No.: US 7,486,736 B2
(45) Date of Patent: Feb. 3, 2009

(54) APPARATUS AND METHOD FOR DIRECT MEASUREMENT OF CHANNEL STATE FOR CODED ORTHOGONAL FREQUENCY DIVISION MULTIPLEXING RECEIVER

(75) Inventor: Sergey Zhidkov, Suwon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 663 days.

(21) Appl. No.: 10/798,946

(22) Filed: Mar. 12, 2004

(65) Prior Publication Data

US 2005/0008084 A1    Jan. 13, 2005

(30) Foreign Application Priority Data

Jul. 9, 2003    (KR) ...................... 10-2003-0046326

(51) Int. Cl.
H04B 1/69    (2006.01)
(52) U.S. Cl. .................. 375/260; 375/343; 375/340
(58) Field of Classification Search ............... 375/260, 375/342, 343; 370/210, 480; 379/93.01
See application file for complete search history.

(56) References Cited

U.S. PATENT DOCUMENTS

| | | | |
|---|---|---|---|
| 5,636,253 A | | 6/1997 | Spruyt |
| 6,158,041 A | * | 12/2000 | Raleigh et al. .............. 714/792 |
| 6,185,251 B1 | * | 2/2001 | Fertner ....................... 375/231 |
| 2002/0060990 A1 | * | 5/2002 | Bohnke et al. ............. 370/270 |
| 2002/0186797 A1 | * | 12/2002 | Robinson .................... 375/341 |
| 2004/0218519 A1 | * | 11/2004 | Chiou et al. ................ 370/203 |

FOREIGN PATENT DOCUMENTS

| | | |
|---|---|---|
| EP | 0 991 239 | 4/2000 |
| EP | 1 221 793 | 1/2002 |

OTHER PUBLICATIONS

Weon-cheol Lee et al "Performance Analysis of Viterbi Decoder Using Channel State Information in COFDM System", IEEE Transactions On Broadcasting, vol. 44, No. 4, Dec. 1998.*
Office Action for corresponding German Application No. 10 2004 033442.0 dated May 11, 2006.

* cited by examiner

*Primary Examiner*—David C Payne
*Assistant Examiner*—Leon Flores
(74) *Attorney, Agent, or Firm*—Harness, Dickey & Pierce

(57) ABSTRACT

An apparatus and method for direct measurement of the channel state of a receiver, such as an OFDM (Orthogonal Frequency Division Multiplexing) receiver. The apparatus adapts a frequency selective channel using a squared Euclidean distance between a received signal value and a de-mapped value for measurement of the channel state and estimates the CSI (Channel State Information) which is also suitable for signal processing with co-channel interference. The estimated CSI may be used in a bit metric calculation of subsequent error correction decoders, such as a Viterbi decoder, to increase system SNR (Signal-to-Noise Ratio) gain. Because receiving equipment, such as digital televisions, receive clearer DVB-T (Terrestrial Digital Video Broadcasting) signals, clearer pictures with less distortion can be displayed, for example, on the digital television.

28 Claims, 13 Drawing Sheets

FIG. 2 (CONVENTIONAL ART)

APPARATUS AND METHOD FOR DIRECT MEASUREMENT OF CHANNEL STATE FOR CODED ORTHOGONAL FREQUENCY DIVISION MULTIPLEXING RECEIVER

CROSS-REFERENCE TO RELATED APPLICATIONS

This application claims the benefit under 35 U.S.C. § 119 (a) of Korean Patent Application No. 2003-0046326, filed on Jul. 9, 2003, the contents of which are hereby incorporated by reference in their entirety.

BACKGROUND OF THE INVENTION

1. Field of the Invention

The present invention relates to an OFDM (Orthogonal Frequency Division Multiplexing) receiver, and more particularly, to an apparatus and method for direct measurement of a channel state using sub-carriers of OFDM signals.

2. Description of the Related Art

CSI (Channel State Information) is generally defined by a SNR (Signal-to-Noise Ratio) of a sub-carrier. There are at least three conventional measurement methods for CSI, an indirect measurement method, a direct measurement method, and a combined method.

A conventional indirect method of channel state measurement uses the magnitude of a channel frequency response calculated in a channel equalizer. This type of method exhibits good performance in a channel with white noise or in a static channel, but does not exhibit good performance in a channel with channel interference, such as a frequency selective channel or a mobile channel. Since analog TV signals are mixed with DVB-T (Terrestrial Digital Video Broadcasting) signals and co-channel interference exists in a co-channel, which has a spectrum as shown in FIG. 7, an indirect method of channel state measurement is not suitable for estimating a channel containing analog TV signals mixed with DVB-T signals.

A conventional direct method of channel state measurement uses differences between a received signal value and the nearest points in an I-Q constellation plot (a constellation plot of In-phase and Quadrature components) as shown in FIG. 5. A description of a conventional direct method is disclosed in a U.S. Pat. No. 5,636,253 or European Pat. No. EP0,991,239. Conventional direct methods exhibit good performance in a channel with channel interference, such as a frequency selective channel or a mobile channel, but do not exhibit good performance in a channel with white noise or in a static channel.

A conventional combined method of channel state measurement discussed in European Pat. No. EP1,221,793, but does not exhibit better performance than a conventional indirect method used for a channel with channel interference, such as a frequency selective channel or a mobile channel.

FIG. 1 is a block diagram of a conventional DVB-T (Terrestrial Digital Video Broadcasting) transmitter. The DVB-T transmitter of FIG. 1 may process an MPEG (Moving Picture Experts Group) bit stream 1 of DVB-T signals and emits the bit stream to the air via an antenna. The DVB-T transmitter may comprise an energy dispersal unit 2, an outer coder 3, an outer interleaver 4, an inner coder 5, an inner interleaver 6, a signal mapper 7, a frame adaptation unit 8, an OFDM (Orthogonal Frequency Division Multiplexing) modulator 9, a DAC (Digital to Analog Converter) 10, and a transmitter front-end 11. As is well known, a signal mapper 7 may generate I (In-phase) and Q (Quadrature) signals according to a modulation format, such as QPSK (Quadrature Phase Shift Keying), 16-QAM (Quadrature Amplitude Modulation), 64-QAM, etc., and a frame adaptation unit 8 changes these signals to a frame structure. Each frame may be made up of 68 OFDM symbols, and each symbol may be made up of a number of active carriers, the number depending on the operation mode. For example, there may be 6817 active carriers in 8k mode or 1705 active carriers in 2k mode. These rules are set as ETSI (European Telecommunication Standard Institute) standards.

A frame adaptation unit 8 may add CPC (Continual Pilot Carrier), SPC (Scattered Pilot Carrier), and TPSC (Transmission Parameter Signaling Carriers) to be used for synchronization, mode detection, and channel estimation to respective OFDM symbols. The positions of these carriers may be set, and as shown in FIG. 2, a scattered pilot insertion pattern may have a form in which every fourth symbol is the same.

FIG. 3 is a block diagram of a conventional DVB-T receiver. The DVB-T receiver of FIG. 3 processes an aerial wave received via an antenna 13 using a procedure inverse to that of the transmitter shown in FIG. 1 and transfers a generated MPEG bit stream to a MPEG processing unit. The DVB-T receiver may comprise a tuner 14, ADC (Analog to Digital Converter) 15, an OFDM de-modulator 16, a sync unit 17, a channel equalizer 18, a TPS decoder 19, a metric calculation and inner de-interleaver 22, a CSI (Channel State Information) processor 24, a Viterbi decoder 25, and an outer de-interleaver, decoder, and de-randomizer 26. The channel equalizer 18 may output an equalized complex OFDM signal and SMCFR (Squared Magnitude of the Channel Frequency Response) and the CSI processor 24 may estimate the degree of certainty for the respective data carriers of an OFDM signal and output CSI.

FIG. 4 is a block diagram of the conventional bit metric calculation and inner de-interleaver 22 shown in FIG. 3. FIG. 4 illustrates a 64-QAM transmission mode. The bit metric calculation and inner de-interleaver 22 may output a symbol, a processing result of CSI, and output signals (I, Q) from the channel equalizer 18 to the Viterbi decoder 25. The bit metric calculation and inner de-interleaver 22 may comprise a symbol de-interleaver 28, bit metric calculators 29-34, bit de-interleavers 35-40, and a bit multiplexer (MUX) 41. A bit metric may be calculated using Equation (1) and the procedure shown in FIG. 5. FIG. 5 is an example of a 16-QAM transmission mode.

$$BM_j = CSI_k \times (|R_k - S_0|^2 - |R_k - S_1|^2) \qquad \text{Equation (1)}$$

where BM is the ith bit metric, $R_k$ is a complex value of a kth carrier, $S_0$ is a value corresponding to a '0' bit at the ith position as a complex value of a nearest point in an I-Q constellation plot, $S_1$ is a value corresponding to a '1' bit at the ith position as a complex value of a nearest point in an I-Q constellation plot, and $CSI_k$ is a CSI signal of the kth carrier.

The conventional DVB-T receiver shown in FIG. 3 adopts an indirect measurement of a channel state using SMCFR, and some problems exist, as described above. In order to improve reduce these problems and improve performance in a channel with channel interference, such as a frequency selective channel or a mobile channel, a direct measurement of channel state as shown in FIG. 6 may be implemented. Conventional direct measurement processors are disclosed in Europe Patent Application EP0,991,239 and also shown in FIG.6.

The conventional CSI processor shown in FIG.6 directly calculates CSI from received signals (I, Q) instead of via SMCFR and may output the CSI to the bit metric calculation and inner de-interleaver 22. The CSI processor may comprise a hard quantizer 44, a subtraction unit 45, a modulus circuit unit 46, a data carrier extraction unit 47, a symbol recursive filter 48, and a non-linear circuit 55. The non-linear circuit 55 may further comprise a log calculation circuit 49, an invert circuit 50, a first adder 51, a multiplier 52, and a second adder.

The performance of direct measurement of the channel state may rely on the time it takes for a symbol recursive filter 48 to calculate an average value. In particular, the more OFDM symbols that are used for the averages, the more reliable the measurement of the channel state. However, a problem exists in that this method is suitable for a static channel but not suitable for a dynamic or mobile channel.

For the same reason as shown in FIG. 7, conventional direct methods may not be suitable for DVB-T signal processing with co-channel interference, because a correlation characteristic of each channel is different from each other. Further, as shown in FIG. 8, another problem exists in that conventional direct methods may not suitable for a frequency selective channel (for example, 2K mode, 8K mode, 16K mode, or 32K mode, etc.).

SUMMARY OF THE INVENTION

Exemplary embodiments of the present invention provide an apparatus and method for direct measurement of the channel state of an OFDM (Orthogonal Frequency Division Multiplexing) receiver which can increase SNR (Signal-to-Noise Ratio) gain by using a squared Euclidean distance between a received signal value and a de-mapped value for measurement of the channel state, is adaptable to a frequency selective channel, can estimate more reliable CSI (Channel State Information) that is suitable for signal processing with co-channel interference, and/or generate CSI that can be used for bit metric calculations of a subsequent error correction decoder, such as a Viterbi decoder.

An exemplary embodiment of the present invention provides an apparatus for direct measurement of the channel state of an OFDM receiver comprising a de-mapping and pilot insertion unit, a subtraction unit, a squared Euclidean distance calculation unit, a non-recursive carrier filtering unit, a data carrier extraction unit, a recursive symbol filtering unit, and a quantization unit.

The de-mapping and pilot insertion unit may receive complex OFDM signals, and perform de-mapping processing corresponding to values belonging to data carriers, TPSC (Transmission Parameter Signaling Carriers) and one of CPC (Continual Pilot Carrier) and SPC (Scattered Pilot Carrier) of the complex OFDM signals, and outputs the de-mapped signals. The subtraction unit may subtract the complex OFDM signals from the de-mapped signals and selectively outputs the subtracted values. The squared Euclidean distance calculation unit may calculate a squared value of a signal for I (In-phase) and a squared value of a signal for Q (Quadrature), of output signals of the subtraction unit, and output a first error which adds the squared values. The non-recursive carrier filtering unit may delay the first error one carrier at a time, multiply filtering coefficients by a present carrier value of the first error and respective multiple delayed carrier values, and output a second error which adds the multiplied values. The data carrier extraction unit may extract and output an error corresponding to the data carrier from the second error. The recursive symbol filtering unit may output a third error which averages an output error of the data carrier extraction unit and a previous symbol. The quantization unit may receive the third error, invert it with a non-linear transfer function relation, and output a CSI signal with quantized multiple bits.

The apparatus for direct measurement of the channel state of an OFDM receiver according to exemplary embodiments of the present invention may also include total delay line which may delay and output the complex OFDM signal as much as the delay of the non-recursive carrier filtering unit. Also, the apparatus for direct measurement of the channel state of an OFDM receiver according to exemplary embodiments of the present invention may include an adaptation unit which may estimate a correlation coefficient signal of two adjacent carriers using a signal corresponding to an inverse number of an SMCFR (Squared Magnitude of the Channel Frequency Response) and output the filtering coefficients belonging to a filtering coefficient group selected according to the estimated correlation coefficient signal.

The de-mapping and pilot insertion unit may include a QAM (Quadrature Amplitude Modulation) de-mapper, a BPSK (Binary Phase Shift Keying) de-mapper, and a reference sequence generator. The QAM de-mapper may de-map and output values belonging to the data carrier according to a QAM format. The BPSK de-mapper may de-map and outputs values belonging to the TPSC according to a BPSK format. The reference sequence generator may substitute and output a sequence of real values for every carrier position corresponding to values belonging to the CPC or the SPC.

The subtraction unit may include a first subtracter, a second subtracter, a third subtracter, a control logic, and a MUX. The first subtracter may subtract and output a complex OFDM signal from a de-mapped signal of values belonging to the data carrier. The second subtracter may subtract and output a complex OFDM signal from a de-mapped signal of values belonging to the TPSC. The third subtracter may subtract and output a complex OFDM signal from a de-mapped signal of values belonging to the CPC or the SPC. The control logic may input a carrier number and a scattered pilot pattern signal, determine the type of the present carrier, and may output a MUX control logic signal depending on whether the present carrier is the data carrier, the TPSC, or the CPC or the SPC. The MUX may selectively output the first subtracter output signal, the second subtracter output signal, or the third subtracter output signal responding to the MUX control logic signals.

The squared Euclidean distance calculation unit may include an IQ signal selector, a first square calculator, a second square calculator, and an adder. The IQ signal selector may divide and output an output signal of the subtraction unit into a signal for I and a signal for Q. The first square calculator may calculate and output a squared value of a signal for I. The second square calculator may calculate and output a squared value of a signal for Q. The adder may output a first error which is a sum of the squared values.

The non-recursive carrier filtering unit may include carrier delay lines, coefficient multipliers, and adders. The carrier delay lines may output delayed multiple carrier values by delaying the first error by one carrier at a time. The coefficient multipliers may multiply and output the filtering coefficients to the present carrier value of the first error and the delayed multiple carrier values. The adders may output a second error which is a sum of the squared values.

The recursive symbol filtering unit may include an adder, a delay line, and a multiplier. The adder may output the third error which is a sum of an output error of the data carrier extraction unit and a first recursive value. The delay line may delay and output the third error by one symbol. The multiplier may output the first recursive value which is a product of a forgetting factor and an output symbol of the delay line.

The quantization unit may include comparators and adders. The comparators may compare the third error to reference levels which have the inverting and non-linear transfer function relation between the levels and the quantized number, and then output a second logic state if the reference levels are higher than the third error, and output a first logic state if the reference levels are not higher than the third error. The adders may add digital output values of the comparators and output a CSI signal of the multiple bits.

The adaptation unit may include a correlation calculation unit and a filter coefficient selection unit. The correlation calculation unit may estimate and output a correlation coefficient signal of two adjacent carriers using a signal corresponding to an inverse number of the SMCFR. The filter coefficient selection unit may output the filtering coefficients belonging to the filtering coefficient group selected according to the estimated correlation coefficient signal.

The correlation calculation unit may include a first filter, a subtracter, a delay line, a multiplier, and a second filter. The first filter may input a signal corresponding to an inverse number of the SMCFR, and calculate and output an average value of the signal and a previous carrier. The subtracter may subtract and output the average value from an input signal corresponding to an inverse number of the SMCFR. The delay line may delay an output signal of the subtracter by one carrier and output an adjacent carrier. The multiplier may multiply and output an output signal of the subtracter and the adjacent carrier. The second filter may input an output signal of the multiplier, calculate an average value of the output signal and a previous carrier, and output the estimated correlation coefficient signal.

The filter coefficient selection unit may include a filter selector and a filter coefficients memory. The filter selector may select the filtering coefficient group according to the estimated correlation coefficient signal. The filter coefficient memory may store filtering coefficients belonging to multiple filtering coefficient groups, and in response to the selection of a filtering coefficient group of the filter selector, output the filtering coefficients belonging to the selected filtering coefficient group.

Another exemplary embodiment of the present invention is directed to a method of directly measuring the channel state of an OFDM receiver including receiving complex OFDM signals, performing de-mapping corresponding to values belonging to data carriers, TPSC, and CPC or SPC of the complex OFDM signals, and outputting the de-mapped signals; subtracting the complex OFDM signals from the de-mapped signals, and outputting the subtracted values; calculating a squared Euclidean distance by calculating a squared value of a signal for I and a squared value of a signal for Q, of output signals of the subtracting, and outputting a first error which is a sum of the squared values; filtering a non-recursive carrier by delaying the first error one carrier at a time, multiplying filtering coefficients by a present carrier value of the first error and multiple delayed carrier values, and outputting a second error which is a sum of the multiplied values; extracting a data carrier by extracting and outputting an error corresponding to the data carrier from the second error; filtering a recursive symbol by outputting a third error averaging an output error of the data carrier extracting and a previous symbol; and quantizing by receiving the third error, inverting the same with a non-linear transfer function relation, and outputting a CSI signal with quantized multiple bits.

In exemplary embodiments, the method of directly measuring the channel state of an OFDM receiver can also include delaying in which the complex OFDM signals are delayed as much as the delay in the non-recursive carrier filtering and output. In exemplary embodiments, the method of directly measuring the channel state of an OFDM receiver further may include adapting in which a correlation coefficient signal of two adjacent carriers is estimated using a signal corresponding to an inverse number of an SMCFR, and the filtering coefficients belonging to a filtering coefficient group selected according to the estimated correlation coefficient signal are output.

In exemplary embodiments, the adapting may include calculating a correlation by estimating and outputting a correlation coefficient signal of two adjacent carriers using a signal corresponding to an inverse number of the SMCFR; and selecting a filter coefficient by outputting the filtering coefficients belonging to the filtering coefficient group selected according to the estimated correlation coefficient signal.

In exemplary embodiments, the correlation calculating may include first filtering by inputting a signal corresponding to an inverse number of the SMCFR, and calculating and outputting an average value of the signal and a previous carrier; subtracting and outputting the average value from an input signal corresponding to an inverse number of the SMCFR; delaying an output signal of the subtracting by one carrier and outputting an adjacent carrier; multiplying and outputting an output signal of the subtracting and the adjacent carrier; and second filtering by inputting an output signal of the multiplying, calculating an average value of the output signal and a previous carrier, and outputting the estimated correlation coefficient signal.

In exemplary embodiments, the filter coefficient selecting may include selecting a filter by selecting the filtering coefficient group according to the estimated correlation coefficient signal and outputting a filter coefficients memory by storing filtering coefficients belonging to respective multiple filtering coefficient groups, and in response to the selection of a filtering coefficient group of the filter selecting, outputting the filtering coefficients belonging to the selected filtering coefficient group.

Another exemplary embodiment of the present invention is directed to a non-recursive carrier filtering device for an apparatus for direct measurement of a channel state of a receiver including a delay unit which delays a first error by one or more carriers and a multiplier unit which multiplies filtering coefficients by a present carrier value and the one or more delayed carrier values and outputs a second error which is a sum of the multiplied values, wherein the second error signal is used to improve channel state estimation.

Another exemplary embodiment of the present invention is directed to a squared Euclidean distance calculating device for an apparatus for direct measurement of a channel state of a receiver including a calculating unit which receives a complex signal for a carrier and calculates a squared value of a signal for I (In-phase) and a squared value of a signal for Q (Quadrature) of the carrier and outputs an error, which is a sum of the squared values, wherein the error is used to improve channel state estimation.

Another exemplary embodiment of the present invention is directed to an adaptation device for an apparatus for direct measurement of a channel state of a receiver including an estimating unit which estimates a correlation coefficient signal of two or more adjacent carriers using a signal corresponding to an inverse a squared magnitude of the channel frequency response and a filter coefficient selection unit which outputs filtering coefficients belonging to a filtering coefficient group selected according to the estimated correlation coefficient signal, wherein the filtering coefficients are used to improve channel state estimation.

Another exemplary embodiment of the present invention is directed to an apparatus for direct measurement of a channel state of a receiver including an adaptation device including an estimating unit which estimates a correlation coefficient signal of two or more adjacent carriers using a signal corresponding to an inverse a squared magnitude of the channel frequency response and a filter coefficient selection unit which outputs filtering coefficients belonging to a filtering coefficient group selected according to the estimated correlation coefficient signal, a squared Euclidean distance calculating device including a calculating unit which receives a complex signal for a carrier and calculates a squared value of a signal for I (In-phase) and a squared value of a signal for Q (Quadrature) of the carrier and outputs a first error, which is a sum of the squared values, and a non-recursive carrier filtering device including a delay unit which delays a first error by one or more carriers and a multiplier unit which multiplies the filtering coefficients by a present carrier value and the one or more delayed carrier values and outputs a second error which is a sum of the multiplied values, wherein the second error signal is used to improve channel state estimation.

Another exemplary embodiment of the present invention is directed to a method of non-recursively filtering a carrier for direct measurement of a channel state of a receiver including delaying a first error by one or more carriers and multiplying filtering coefficients by a present carrier value and the one or more delayed carrier values and outputs a second error which is a sum of the multiplied values, wherein the second error signal is used to improve channel state estimation.

Another exemplary embodiment of the present invention is directed to a method of calculating a squared Euclidean distance for direct measurement of a channel state of a receiver including receiving a complex signal for a carrier and calculates a squared value of a signal for I (In-phase) and a squared value of a signal for Q (Quadrature) of the carrier and outputting an error, which is a sum of the squared values, wherein the error is used to improve channel state estimation.

Another exemplary embodiment of the present invention is directed to a method of performing adaptation for an apparatus for direct measurement of a channel state of a receiver including estimating a correlation coefficient signal of two or more adjacent carriers using a signal corresponding to an inverse a squared magnitude of the channel frequency response and outputting filtering coefficients belonging to a filtering coefficient group selected according to the estimated correlation coefficient signal, wherein the filtering coefficients are used to improve channel state estimation.

Another exemplary embodiment of the present invention is directed to a method of directly measuring the channel state of an OFDM receiver including estimating a correlation coefficient signal of two or more adjacent carriers using a signal corresponding to an inverse a squared magnitude of the channel frequency response, outputting filtering coefficients belonging to a filtering coefficient group selected according to the estimated correlation coefficient signal, receiving a complex signal for a carrier and calculates a squared value of a signal for I (In-phase) and a squared value of a signal for Q (Quadrature) of the carrier and outputs a first error, which is a sum of the squared values, delaying a first error by one or more carriers and a multiplier unit which multiplies the filtering coefficients by a present carrier value and the one or more delayed carrier values, and outputting a second error which is a sum of the multiplied values, wherein the second error signal is used to improve channel state estimation.

BRIEF DESCRIPTION OF THE DRAWINGS

The present invention will become more apparent by describing in detail exemplary embodiments thereof with reference to the attached drawings in which:

Figure 2:
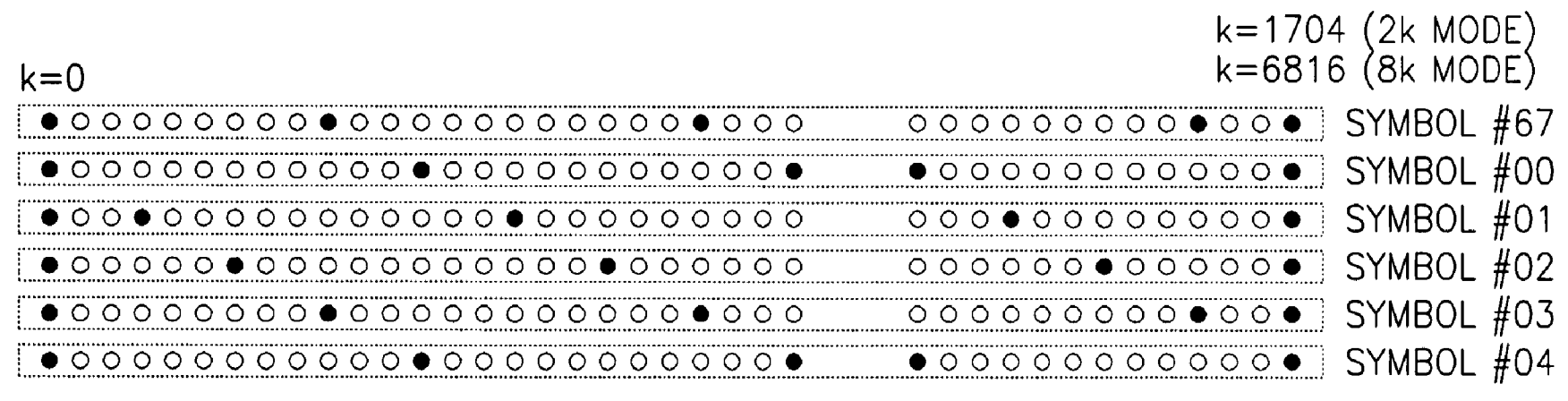

FIG. 2 illustrates a pilot array of a conventional DVB-T system;

DETAILED DESCRIPTION OF THE INVENTION

Figure 9:
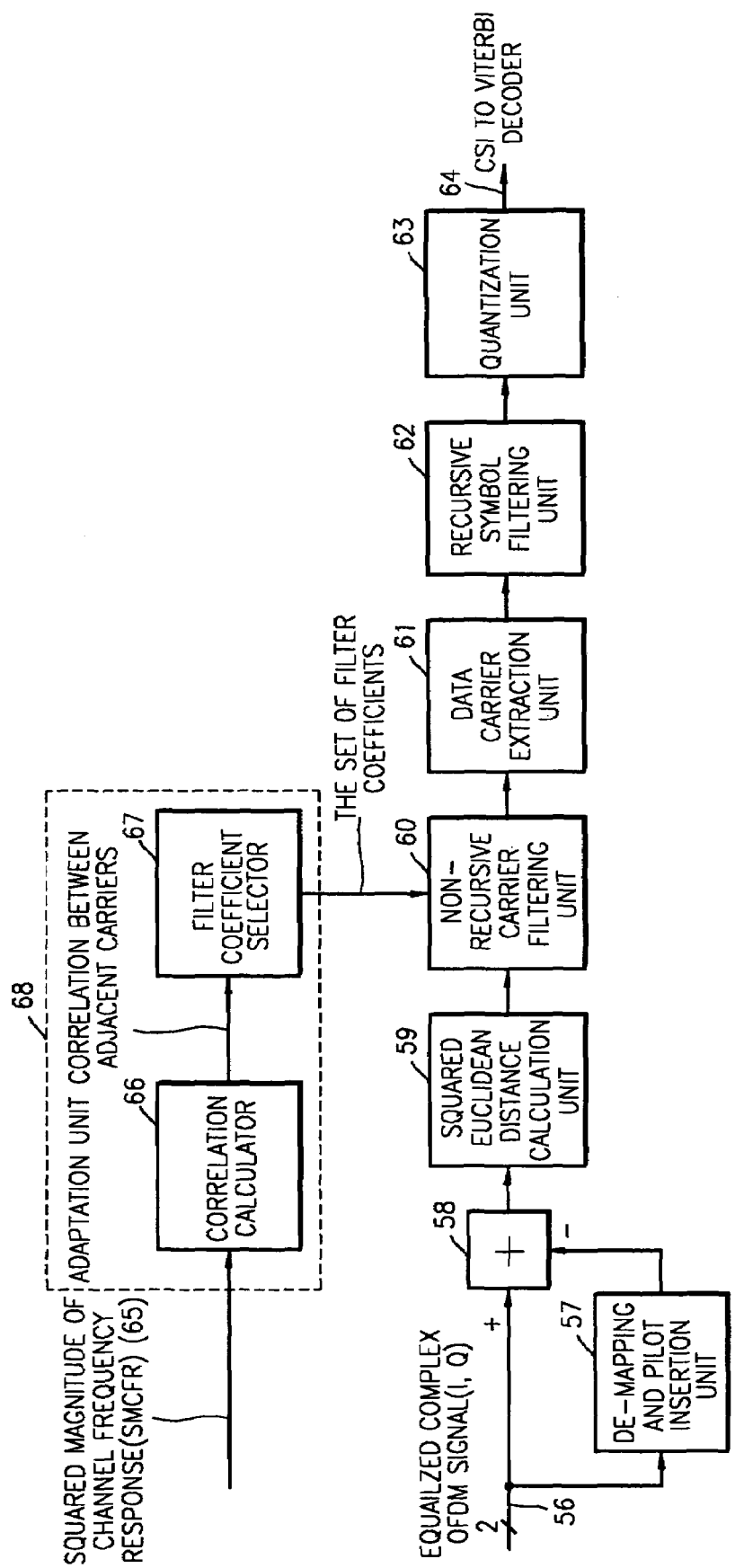
FIG. 9 is a block diagram of an apparatus for direct measurement of the channel state of an OFDM (Orthogonal Frequency Division Multiplexing) receiver according to an exemplary embodiment of the present invention.
Figure 10:
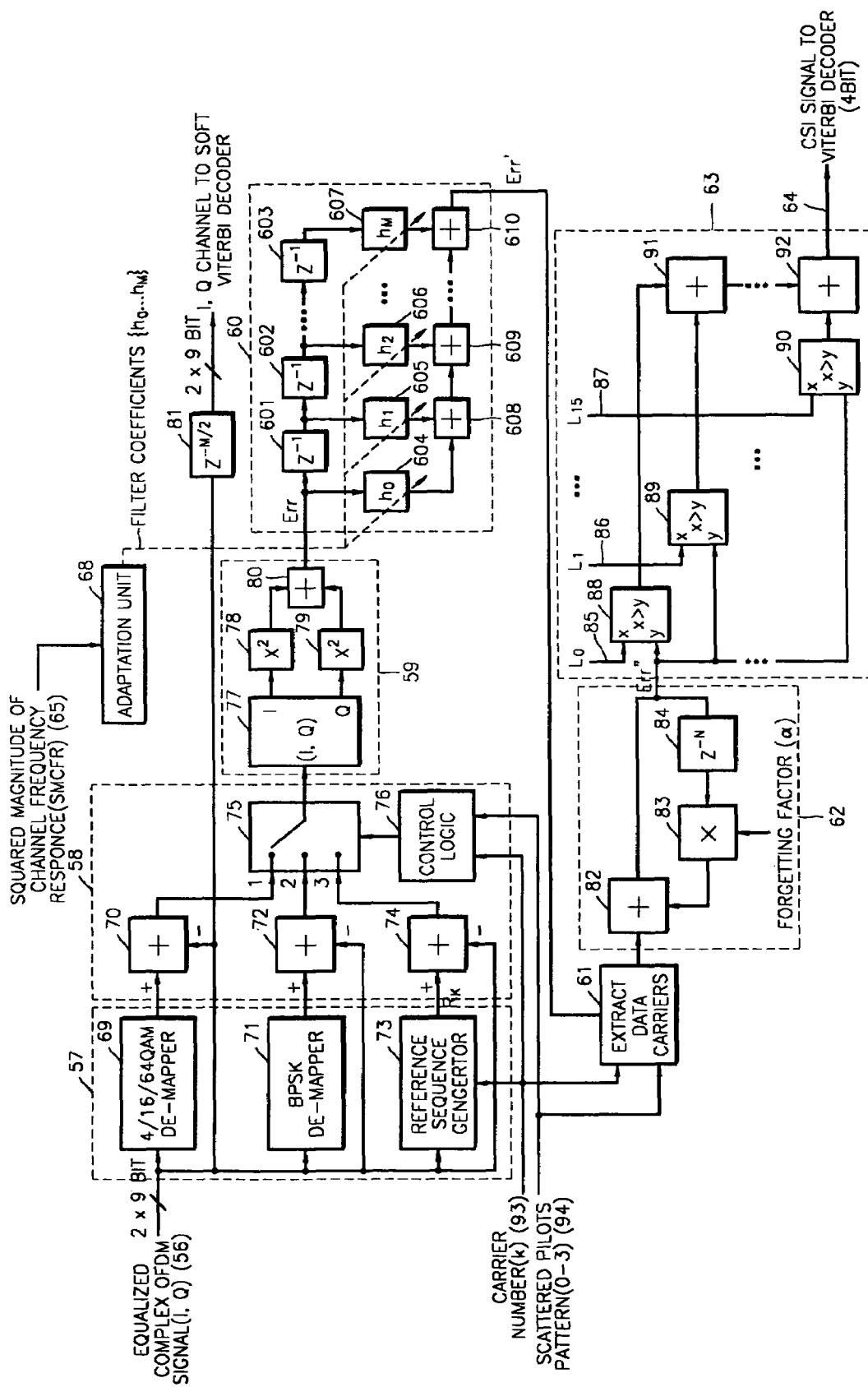
FIG. 10 is a detailed block diagram of FIG. 9 according to an exemplary embodiment of the present invention.

FIG. 9 is a block diagram of an apparatus for direct measurement of the channel state of an OFDM receiver according to an exemplary embodiment of the present invention. FIG. 10 is a detailed block diagram of FIG. 9 according to another exemplary embodiment of the present invention.

With reference to FIGS. 9 and 10, an apparatus for direct measurement of the channel state of an OFDM receiver according to an exemplary embodiment of the present invention may include a de-mapping and pilot insertion unit 57, a subtraction unit 58, a squared Euclidean distance calculation unit 59, a non-recursive carrier filtering unit 60, a data carrier extraction unit 61, a recursive symbol filtering unit 62, and a quantization unit 63. In addition, the apparatus for direct measurement of the channel state of an OFDM receiver may also include a total delay line 81. Also, the apparatus for direct measurement of the channel state of an OFDM receiver may also include an optional adaptation unit 68.

Figure 1:
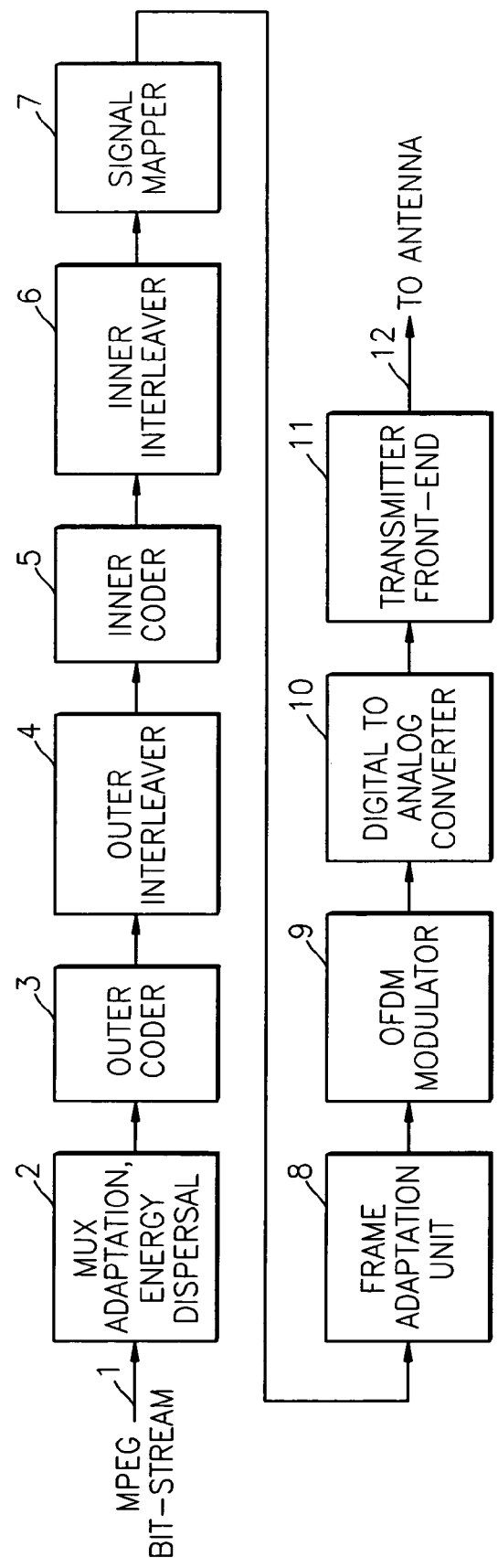
FIG. 1 is a block diagram of a conventional DVB-T (Terrestrial Digital Video Broadcasting) transmitter.
Figure 3:
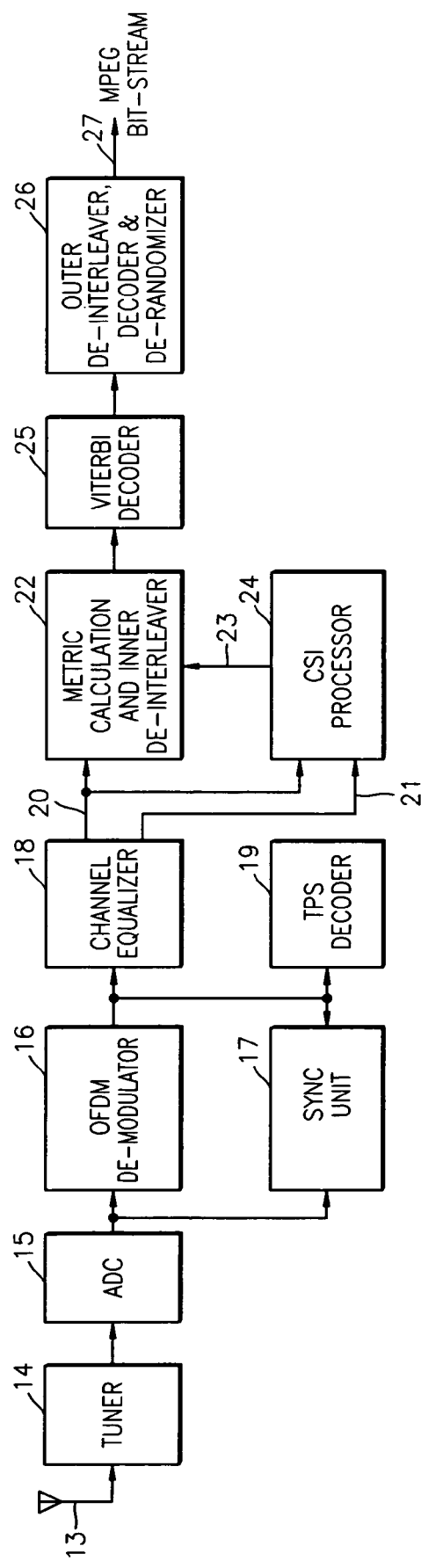
FIG. 3 is a block diagram of a conventional DVB-T receiver.
Figure 4:
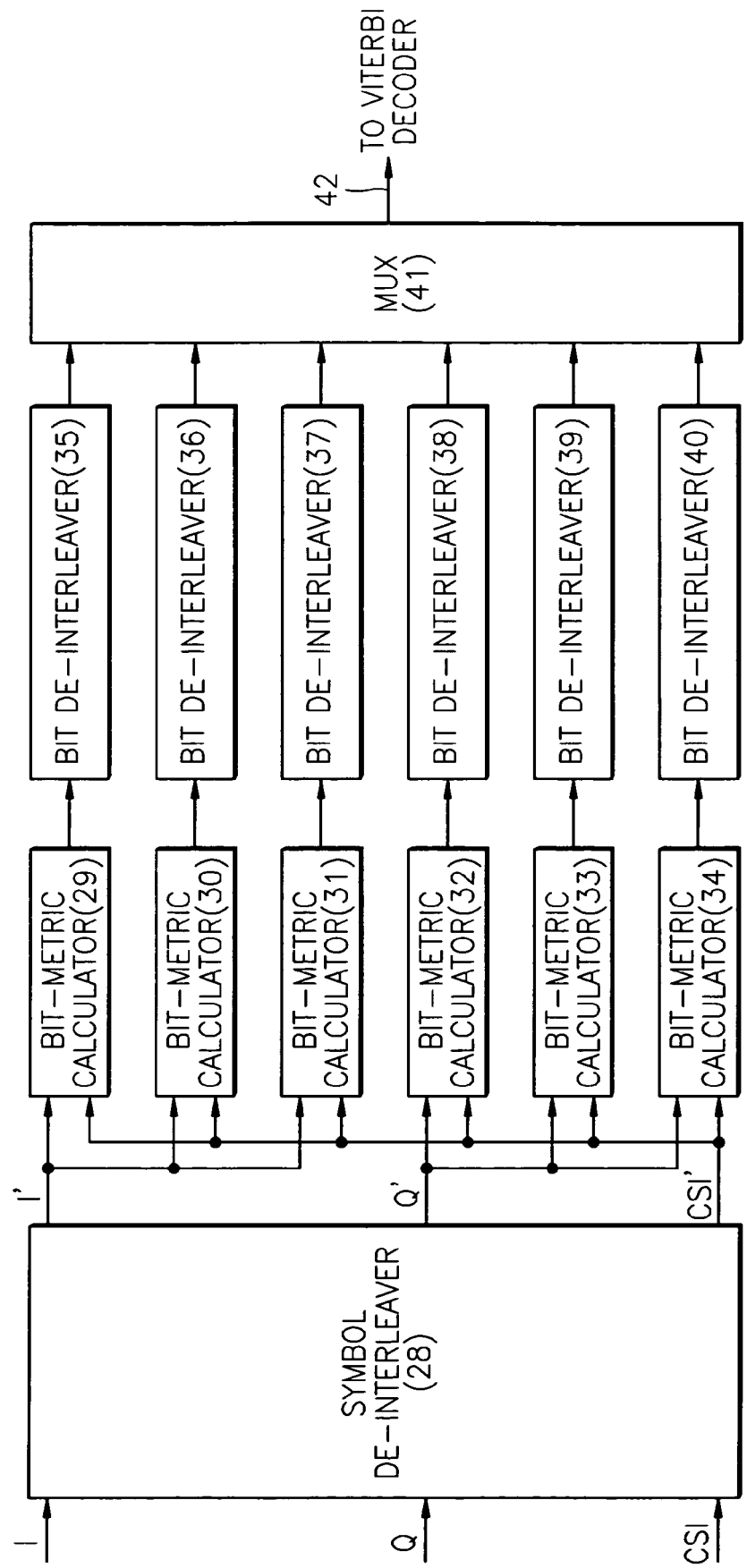
FIG. 4 is a block diagram of a conventional bit metric calculation and inner de-interleaving unit shown in FIG. 3.
Figure 5:
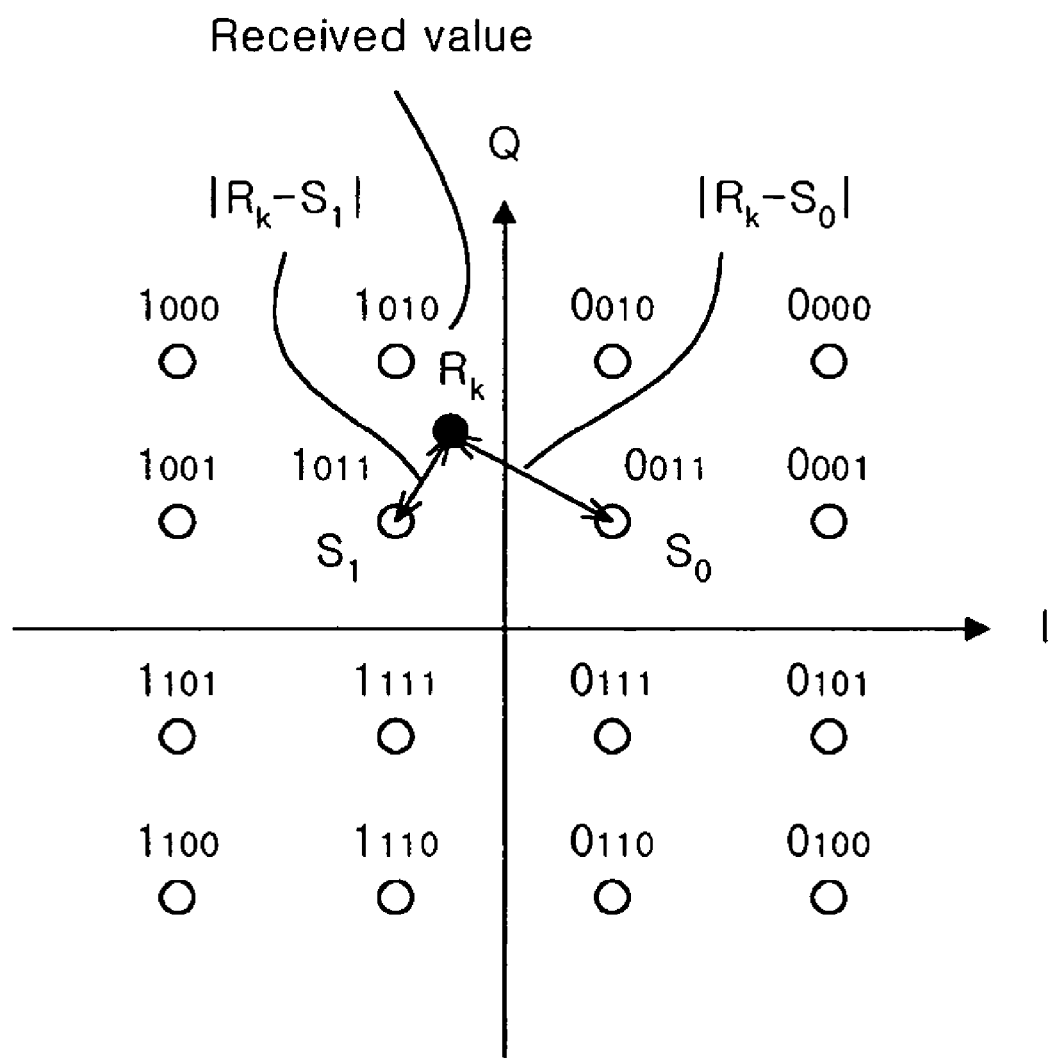
FIG. 5 illustrates a conventional bit metric calculation procedure.
Figure 6:
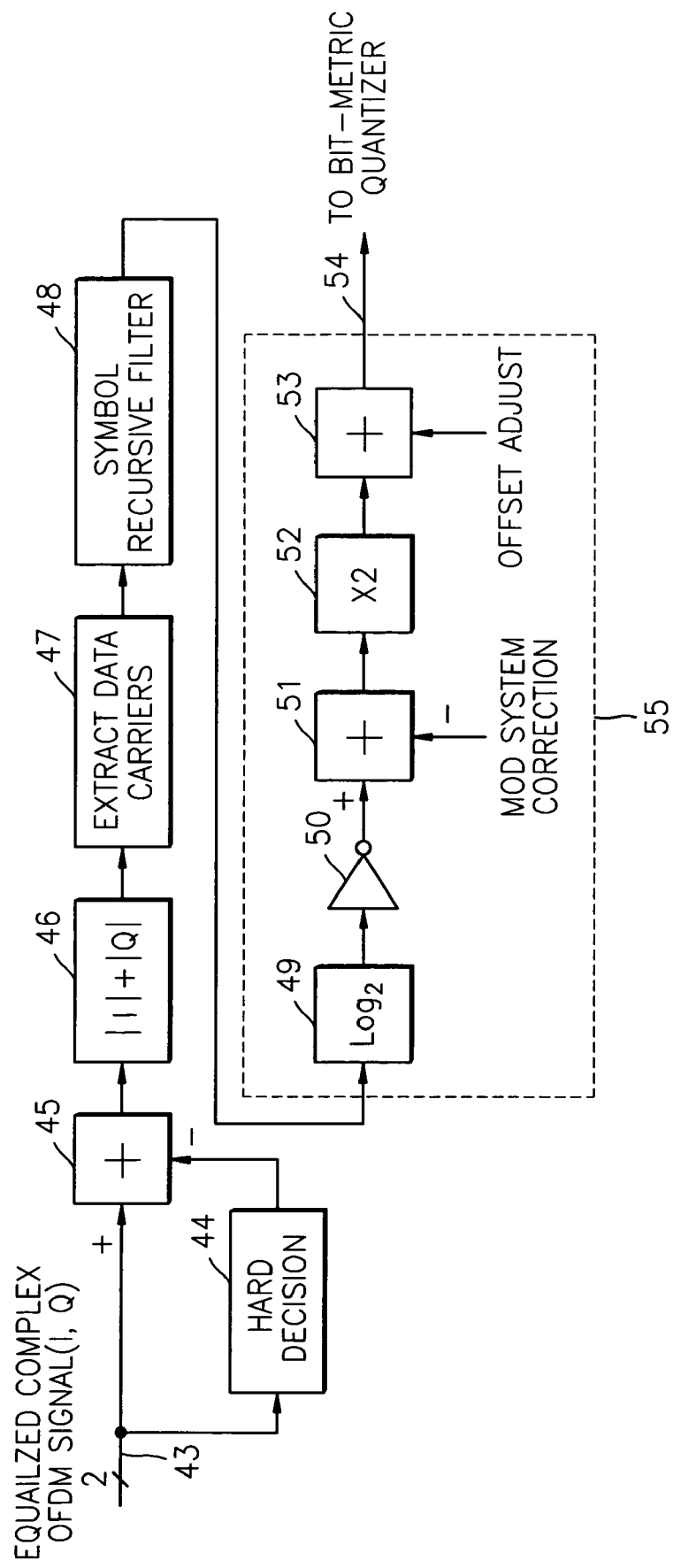
FIG. 6 is a block diagram of a conventional CSI (Channel State Information) processor for a direct calculation method.
Figure 7:
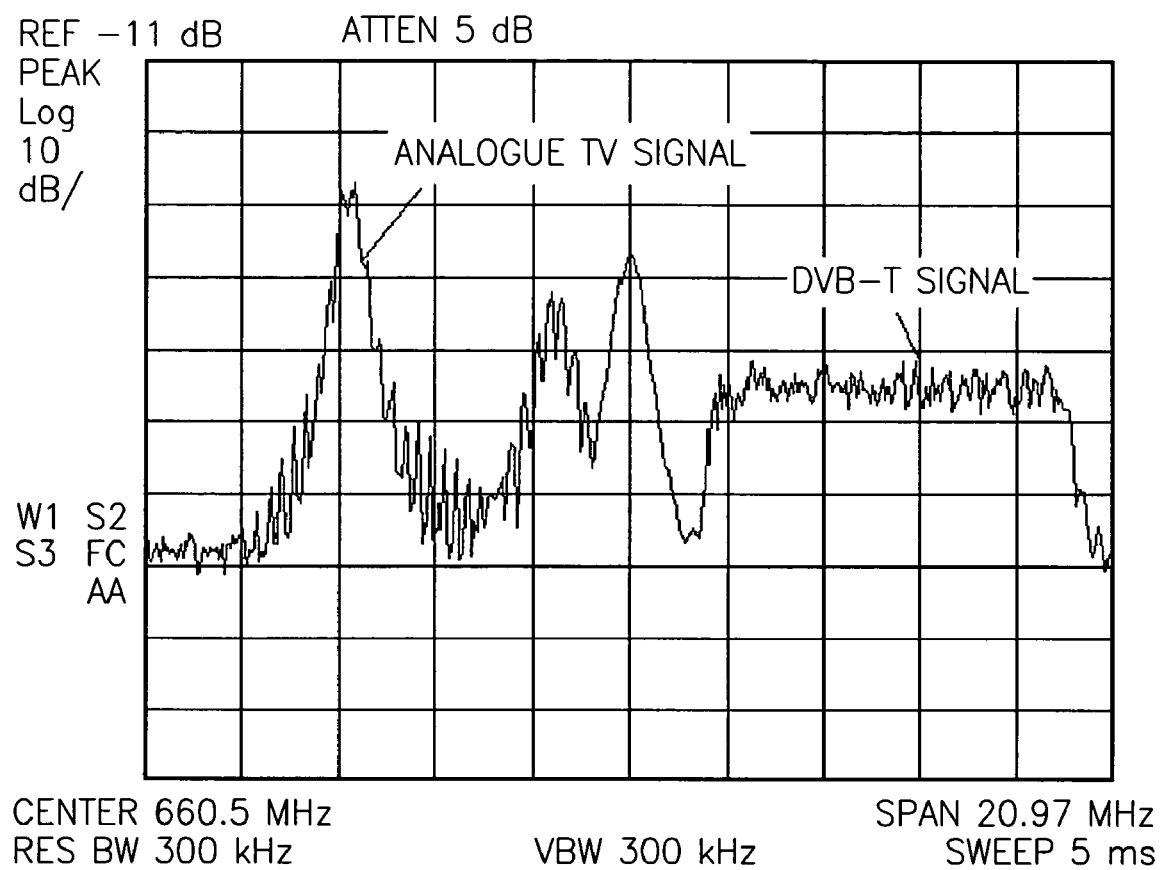
FIG. 7 illustrates a conventional DVB-T signal spectrum and interference spectrum.

The de-mapping and pilot insertion unit 57 may receive complex OFDM signals (equalized I, Q), and may perform de-mapping processing corresponding to respective values belonging to data carriers, for example, TPSC and one or more of CPC and SPC of the complex OFDM signals (equalized I, Q), and outputs the de-mapped signals. The complex OFDM signals (equalized I, Q) are made up of I and Q signals and may be equalized in a channel equalizer (for example, the channel equalizer 18 of FIG. 3). The de-mapping and pilot insertion unit 57 may include a QAM de-mapper 69, a BPSK de-mapper 71, and a reference sequence generator 73. The QAM de-mapper 69 de-maps and outputs values belonging to the data carrier according to a QAM format. The QAM format can be selectively used as 4-QAM, 16-QAM, and/or 64-QAM, etc. The BPSK de-mapper 71 de-maps and outputs values belonging to the TPSC according to a BPSK format. The reference sequence generator 73 may substitute and output a sequence of real values ($R_k$) at every carrier position corresponding to values belonging to the CPC or the SPC. An example sequence of real values ($R_k$) can be generated from an exemplary equation, such as Equation (2)

$$R_k = 4/3 \times 2(\frac{1}{2} - w_k) \quad \text{Equation (2)}$$

where $w_k$ is a pseudo random binary sequence set by, for example, the European Telecommunication Standard Institute (ETSI).

The subtraction unit 58 may subtract the complex OFDM signals (equalized I, Q) from the respective de-mapped signals and selectively output the subtracted values. The subtraction unit 58 may include a first subtracter 70, a second subtracter 72, a third subtracter 74, a control logic 76, and a MUX 75. The first subtracter 70 may subtract and output the complex OFDM signal (equalized I, Q) from a de-mapped signal of values belonging to the data carrier. The second subtracter 72 may subtract and output the complex OFDM signal (equalized I, Q) from a de-mapped signal of values belonging to the TPSC. The third subtracter 74 may subtract and output the complex OFDM signal (equalized I, Q) from a de-mapped signal of values belonging to the CPC and/or the SPC. The control logic 76 may input a carrier number and a scattered pilot pattern signal, distinguish the type of carrier present, and output MUX control logic signals depending on whether thee carrier is a data carrier, a TPSC, or a CPC and/or the SPC, respectively. The MUX 75 may selectively output the first subtracter 70 output signal, the second subtracter 72 output signal, or the third subtracter 74 output signal in response to the MUX control logic signal. For example, in the control logic 76, if a present carrier is determined to be a data carrier, the MUX 75 outputs an output signal of the first subtracter 70.

The squared Euclidean distance calculation unit 59 may calculate a squared value of a signal for I and a squared value of a signal for Q, respectively, of output signals of the subtraction unit 58, and output a first error (Err) which is a sum of the squared values. The squared Euclidean distance calculation unit 59 may include an IQ signal selector 77, a first square calculator 78, a second square calculator 79, and an adder 80. The IQ signal selector 77 may divide and output an output signal of the subtraction unit 58 into a signal for I and a signal for Q, respectively. The first square calculator 78 may calculate and output a squared value of a signal for I. The second square calculator 79 may calculate and output a squared value of a signal for Q. The adder 80 may output a first error (Err) which adds the squared values. The first error (Err) can be determined, for example, by Equation (3)

$$\text{Err} = d_I \times d_I + d_Q \times d_Q \quad \text{Equation (3)}$$

where $d_I$ and $d_Q$ are signals for I and Q, respectively, of output signals of the subtraction unit 58.

The non-recursive carrier filtering unit 60 may delay the first error one carrier at a time, multiply filtering coefficients $\{h_0 \ldots h_M\}$ by a present carrier value of the first error (Err) and respective multiple delayed carrier values, and output a second error (Err') which is a sum of the multiplied values. The non-recursive carrier filtering unit 60 may include carrier delay lines 601~603, coefficient multipliers 604~607, and adders 608~610. The carrier delay lines 601~603 may output multiple delayed carrier values by delaying the first error (Err) one carrier at a time. The coefficient multipliers 604~607 may multiply and output the filtering coefficients $\{h_0 \ldots h_M\}$ to the present carrier value of the first error (Err) and the delayed multiple carrier values, respectively. The adders 608~610 may output a second error (Err') which is a sum of the squared values. The second error (Err') may be calculated by, for example, Equation (4). The non-recursive carrier filtering unit 60 may cause a signal delay by M/2 when the filter order is M. Therefore, a total delay line 81 may also be used to delay and output the complex OFDM signals (equalized I, Q) by M/2. A Viterbi decoder may then receive the complex OFDM signals (equalized I, Q) output from the total delay line 81 and CSI described below, and decode them.

$$\text{Err}'_{k,t} = h_0 \times \text{Err}_{k-M/2,t} + \ldots + h_{M/2-1} \times \text{Err}_{k-1,t} + h_{M/2} \times \text{Err}_{k,t} + h_{M/2+1} \times \text{Err}_{k+1,t} + \ldots + h_M \times \text{Err}_{k+M/2,t} \quad \text{Equation (4)}$$

where $\text{Err}_{k,t}$ is a first error, $\text{Err}'_{k,t}$ is a second error, k is a carrier number, t is a symbol number, $\{h_0 \ldots h_M\}$ are filtering coefficients, and M is a filter order.

Figure 8:
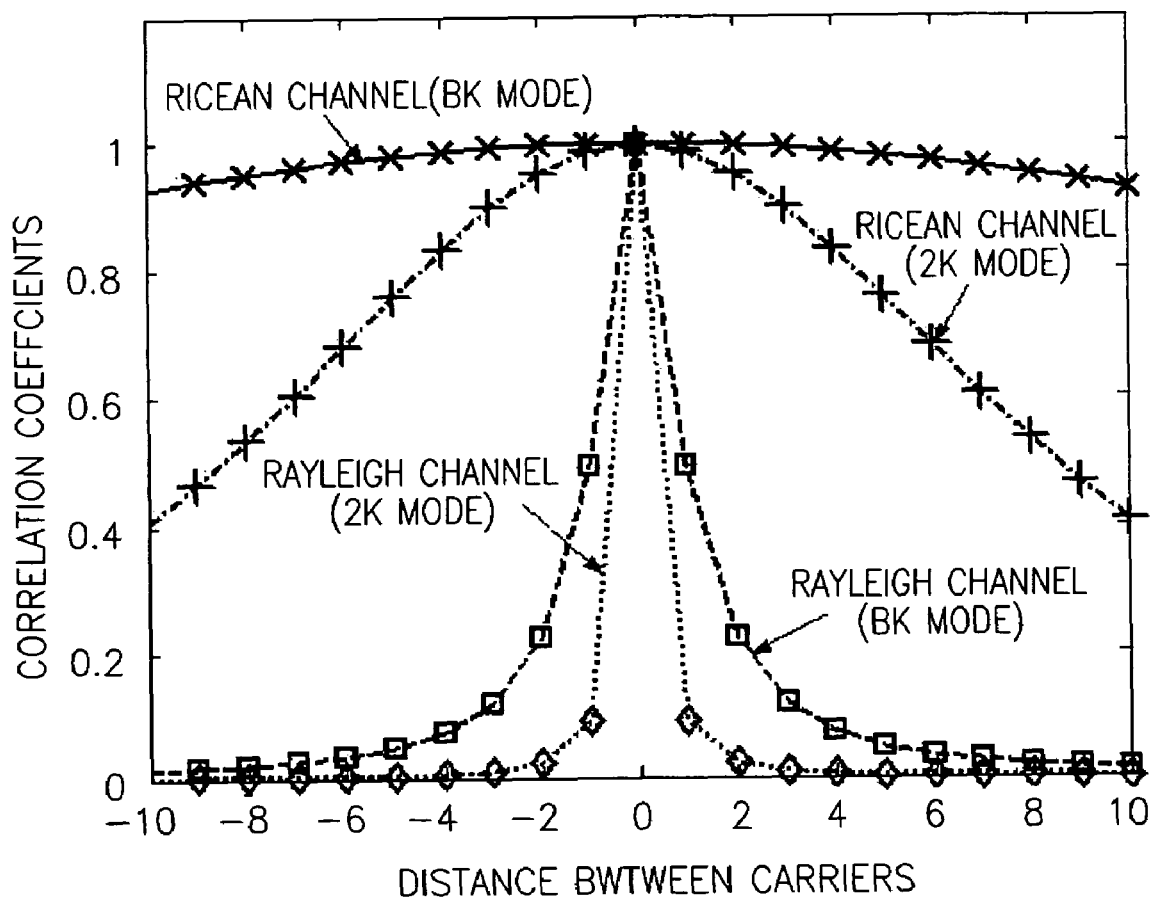
FIG. 8 illustrates a conventional correlation among adjacent carriers for several operation modes.

The filtering coefficients $\{h_0 \ldots h_M\}$ can be calculated in an optional adaptation unit 68. The adaptation unit 68 may calculate a carriers' correlation, and then calculate the filtering coefficients $\{h_0 \ldots h_M\}$ adaptive to channels which have a frequency selective channel or co-channel interference. A second error (Err') output from the non-recursive carrier filtering unit 60 can be inversely proportional to an SMCFR. Therefore, a frequency response characteristic of the non-recursive carrier filtering unit 60 also has curves as shown in FIG. 8, which means that, in different channels, filters having different filtering coefficients $\{h_0 \ldots h_M\}$ can be adapted. For example, as shown in FIG. 8, in a Rayleigh 2K mode channel, because correlation among carriers is small, just a few adjacent carriers can be used for an average calculation, but in a Ricean 8K mode channel, because correlation among carriers is large, more adjacent carriers may be used for average calculation. Because the adaptation unit 68 calculates the filtering coefficients $\{h_0 \ldots h_M\}$ adaptive to channels which have a frequency selective channel or co-channel interference and outputs them to the non-recursive carrier filtering unit 60, this problem may be reduced.

Figure 11:
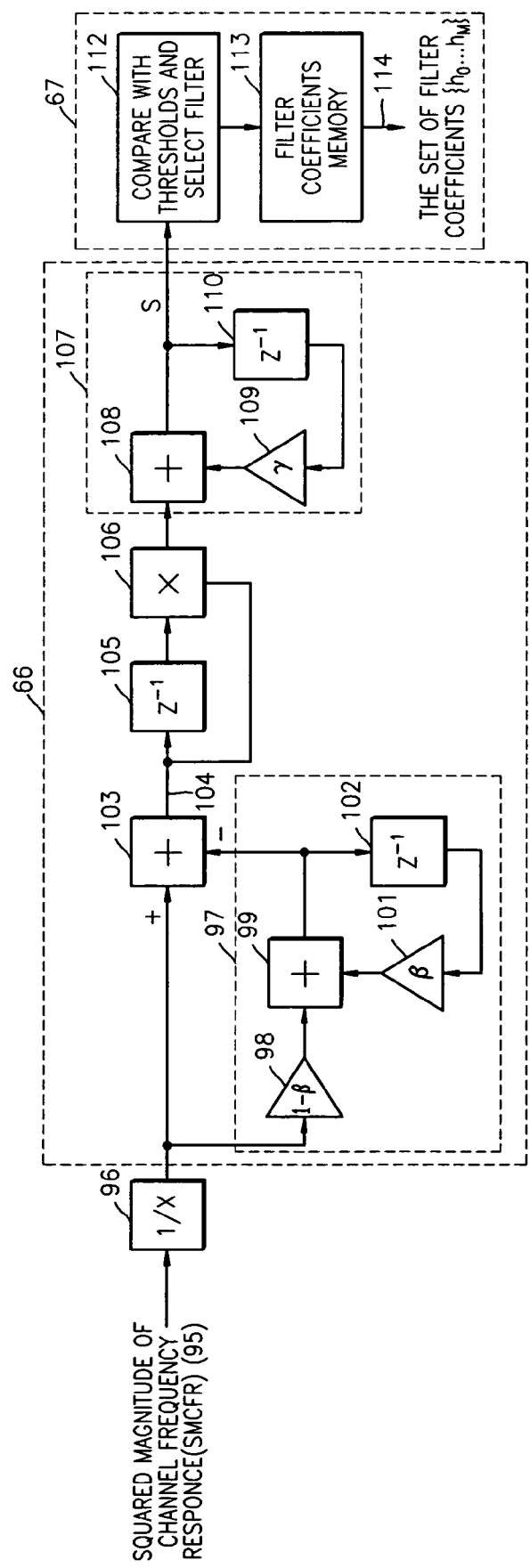
FIG. 11 is a detailed block diagram of the adaptation unit shown in FIGS. 9 and 10 according to an exemplary embodiment of the present invention.

FIG. 11 is a detailed block diagram of the adaptation unit 68 of FIGS. 9 and 10 according to an exemplary embodiment of the present invention.

With reference to FIG. 11, the adaptation unit 68 may include a correlation calculation unit 66 and a filter coefficient selection unit 67. The adaptation unit 68 may estimate a correlation coefficient signal (S) of two adjacent carriers using a signal corresponding to an inverse number of the SMCFR and output the filtering coefficients $\{h_0 \ldots h_M\}$ belonging to the filtering coefficient group selected according to the estimated correlation coefficient signal (S). The inverse number of the SMCFR can also be directly input from a channel equalizer 18 in FIG. 3, and in a case where a channel equalizer 18 in FIG. 3 outputs the SMCFR, the adaptation unit 68 can also include an inverse number calculator 96 as shown in FIG. 11. The correlation calculation unit 66 may estimate and output a correlation coefficient signal (S) of two adjacent carriers using a signal corresponding to an inverse number of the SMCFR. The filter coefficient selection unit 67 may output the filtering coefficients $\{h_0 \ldots h_M\}$ belonging to the filtering coefficient group selected according to the estimated correlation coefficient signal (S).

The correlation calculation unit 66 may include a first filter 97, a subtracter 103, a delay line 105, a multiplier 106, and a second filter 107. The first filter 97 may input a signal corresponding to an inverse number of the SMCFR, then calculate and output an average value of the signal and a previous carrier. The subtracter 103 may subtract and output the average value from an input signal corresponding to an inverse number of the SMCFR. The delay line 105 may delay an output signal of the subtracter 103 by one carrier and output an adjacent carrier. The multiplier 106 may multiply and output an output signal of the subtracter 103 and the adjacent carrier. The second filter 107 may input an output signal of the multiplier 106, calculate an average value of the output signal and a previous carrier, and output the estimated correlation coefficient signal (S).

The first filter 97 may include a first sub multiplier 98, a first sub adder 99, a first sub delay line 102, and a second sub multiplier 101. The first sub multiplier 98 may multiply and output a first time constant $(1-\beta)$ to a signal corresponding to an inverse number of the SMCFR. The first sub adder 99 may add and output an output signal of the first sub multiplier 98 and a second recursive value. The first sub delay line 102 may delay and output an output of the first sub adder 99 by one carrier. The second sub multiplier 101 may output the second recursive value which multiplies a second time constant $\beta$ to an output carrier of the first sub delay line 102. The second time constant $\beta$ may be a value that is obtained experimentally.

The second filter 107 may include a second sub adder 108, a second sub delay line 110, and a third sub multiplier 109. The second sub adder 108 may output the estimated correlation coefficient signal (S) which adds an output signal of the multiplier 106 and a third recursive value. The second sub delay line 110 may delay and output the estimated correlation coefficient signal (S) with one carrier. The third sub multiplier 109 may output the third recursive value which multiplies a third time constant $\gamma$ by an output carrier of the second sub delay line 110. The third time constant $\gamma$ may also be a value that is obtained experimentally.

As described above, the estimated correlation coefficient signal (S) which is calculated and output can be determined, for example, in accordance with Equation (5).

$$S \approx M[(x_k - M[x])(x_{k-1} - M[x])] \qquad \text{Equation (5)}$$

where M[ ] represents an average value.

The filter coefficient selection unit 67 may include a filter selector 112 and a filter coefficients memory 113. The filter selector 112 may select the filtering coefficient group according to the estimated correlation coefficient signal (S). The filter coefficients memory 113 may store filtering coefficients $h_0 \ldots h_M$} belonging to respective multiple filtering coefficient groups, and in response to the selection of a filtering coefficient group of the filter selector 112, output the filtering coefficients $\{h_0 \ldots h_M\}$ belonging to the selected filtering coefficient group. In an exemplary embodiment, the number of filtering coefficient groups may be sufficient for 4 groups. That is, in a Rayleigh or Ricean channel having characteristics as shown in FIG. 8, there are 4 filtering coefficient groups corresponding to the respective 2K, 8K, 16K, and 32K operation modes. In other exemplary embodiments, more filtering coefficient groups for other operation modes can be added, if desired.

Returning to FIG. 9, the data carrier extraction unit 61 may extract and output an error corresponding to the data carrier from the second error (Err').

The recursive symbol filtering unit 62 may output a third error (Err") which averages an output error of the data carrier extraction unit 61 and a previous carrier. The recursive symbol filtering unit 62 may include an adder 82, a delay line 84, and a multiplier 83. The adder 82 may output the third error (Err") which adds an output error of the data carrier extraction unit 61 and a first recursive value. The delay line 84 may delay and output the third error (Err") by one symbol. The multiplier 83 may output the first recursive value which multiplies a given forgetting factor ($\alpha$) to an output symbol of the delay line 84. The third error (Err") can be determined, for example, by Equation (6). In Equation (6), the forgetting factor ($\alpha$) may be obtained experimentally.

$$\text{Err}''_{k,t} = \text{Err}'_{k,t} + \alpha \times \text{Err}'_{k,t-1} \qquad \text{Equation (6)}$$

Figure 12:
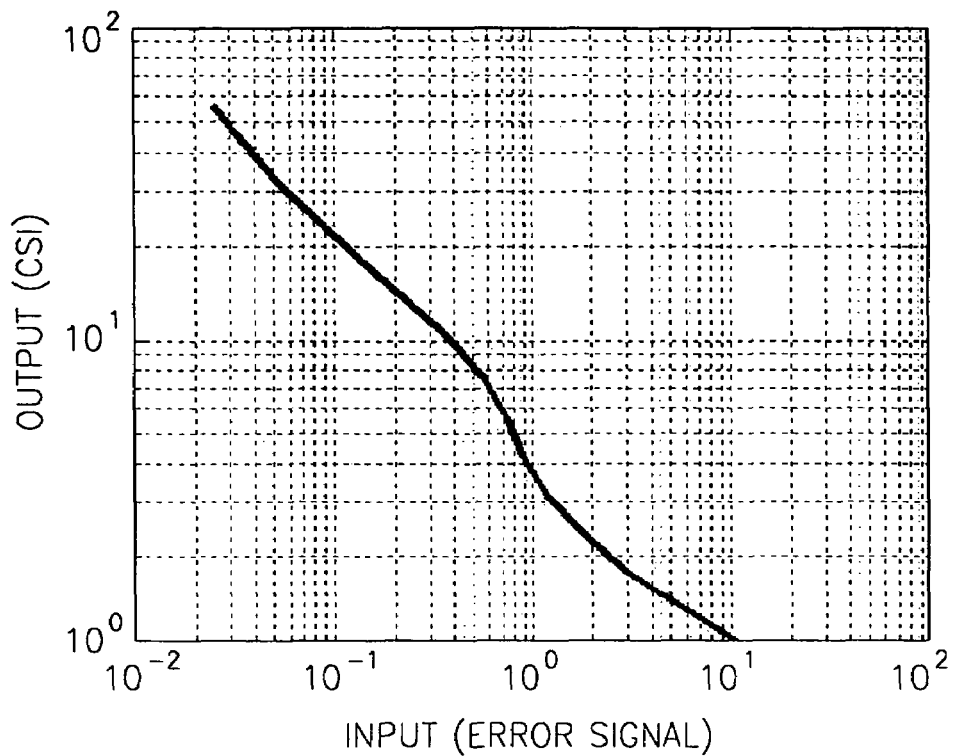
FIG. 12 illustrates a relationship between error signals and an SNR (Signal-to-Noise Ratio) according to an exemplary embodiment of the present invention.
Figure 13:
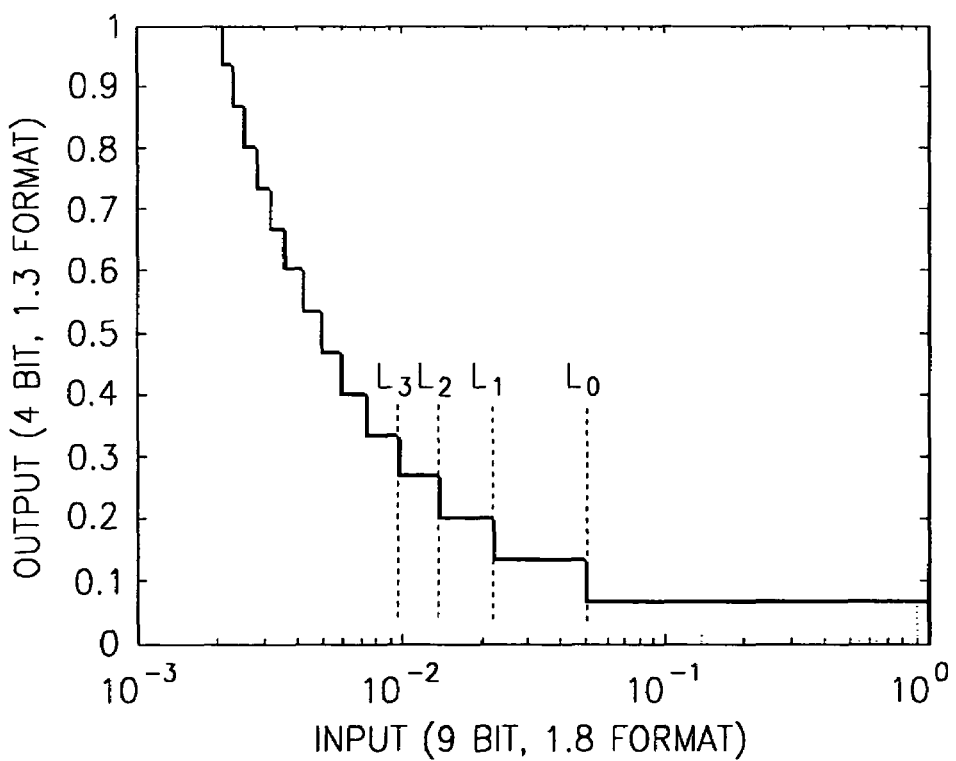
FIG. 13 illustrates a transfer function performed in a quantization unit in FIGS. 9 and 10 which generates 4 bits of channel state information according to an exemplary embodiment of the present invention.

The quantization unit 63 may receive the third error (Err"), invert it into a non-linear transfer function relation, and output a CSI signal with quantized multiple bits. The quantization unit 63 may include comparators 88~90 and adders 91~92. The comparators 88~90 may compare the third error (Err") and respective reference levels (L0~L15) having the inverting and non-linear transfer function relation between the levels and the quantized number, and if the respective reference levels (L0~L15) are larger than the third error (Err"), output a second logic state (for example, a logic high state), and if the respective reference levels (L0~L15) are not larger than the third error (Err"), output a first logic state (for example, a logic low state). The reference levels (L0~L15) may be made up of levels converting a maximum number of the quantized bits into a decimal numeral. The adders 91~92 may add digital output values of the comparators 88~90 and output a CSI signal with the multiple bits. The exemplary transfer function of FIG. 13 is an inverting and non-linear transfer function which transforms an input variable into an inverted output result, and is an approximate value, based on an experiment result for a DVB-T signal of a 64 QAM mode as shown in FIG. 12. In FIG. 13, "4 bit, 1.3 format", for example, is transformed using Equation (7) when a 4-bit digital value $O_0 O_1 O_2 O_3$ is shown as a decimal. When the 4-bit digital value $O_0 O_1 O_2 O_3$ is displayed as a decimal, values from 0 to 15 can be shown, and these values correspond to the reference levels (L0~L15) in a one-to-one relationship. In the same way, in FIG. 13, "9 bit, 1.8 format", for example, may be transformed using Equation (8) when a 9-bit digital value $I_0 I_1 I_2 I_3 I_4 I_5 I_6 I_7 I_8$ is shown as a decimal value. By this method, CSI is a digital value quantized as 3 bits or 4 bits. In other exemplary embodiments, CSI can be quantized into bit numbers other than 3 or 4, if desired.

$$O_0 * 2^0 + O_1 * 2^{-1} + O_2 * 2^{-2} + O_3 * 2^{-3} \qquad \text{Equation (7)}$$

$$I_0 * 2^0 + I_1 * 2^{-1} + I_2 * 2^{-2} I_3 * 2^{-3} I_4 * 2^{-4} I_5 * 2^{-5}$$
$$I_6 * 2^{-6} I_7 * 2^{-7} I_8 * 2^{-8} \qquad \text{Equation (8)}$$

Figure 14:
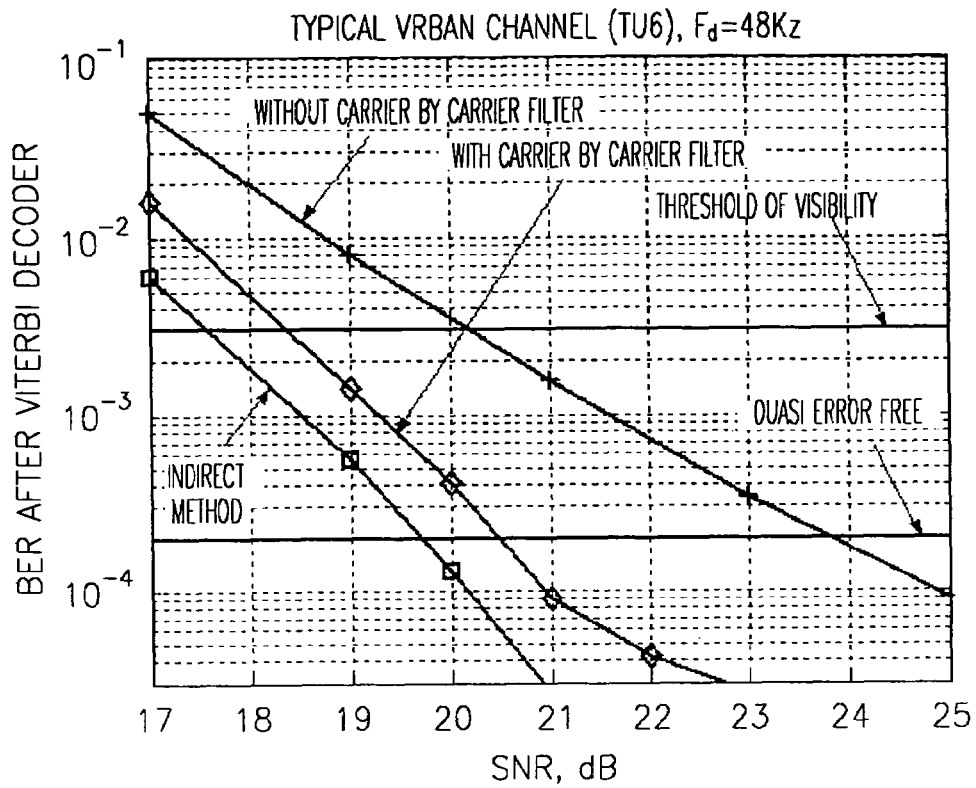
FIG. 14 illustrates a simulation result for a direct measurement of the channel state of FIG. 9 on a multi-path channel according to an exemplary embodiment of the present invention.
Figure 15:
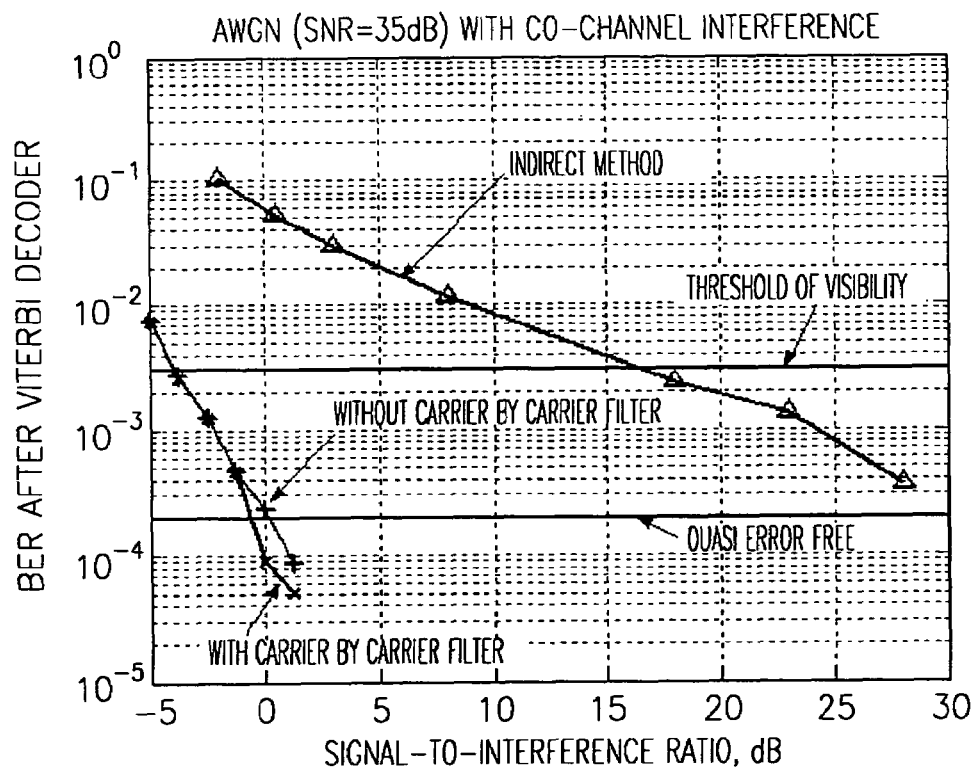
FIG. 15 illustrates a simulation result of the case adapting the apparatus for direct measurement of the channel state of FIG. 9 on a channel with co-channel interference according to an exemplary embodiment of the present invention.

FIG. 14 illustrates a simulation result for the apparatus for direct measurement of the channel state of FIG. 9 on a multi-path channel. FIG. 15 illustrates a simulation result for the apparatus for direct measurement of the channel state of FIG. 9 on a channel with co-channel interference (interference from analog TV signal, PAL-I). In an exemplary embodiment, the system used for simulation is a DVB-T system which uses a 1/32 guard interval, a 2/3 inner code rate, and a 64-QAM modulation method, and operates in a 2K mode. As shown in FIG. 14, there is little degradation in comparison to a method of indirectly measuring the channel state, and as shown in FIG. 15, in a channel with co-channel interference, performance is considerably improved in comparison to the indirect method. Also, in FIG. 14, using the non-recursive carrier filtering unit 60 of exemplary embodiments of the present invention, a gain of about SNR 3.3 dB at 2*10$^{-4}$ BER (Bit Error Rate) may be achieved.

As described above, an apparatus for direct measurement of the channel state of an OFDM receiver according to exemplary embodiments of the present invention may include a non-recursive carrier filtering unit 60, which delays the first error (Err) by one (or more) carrier, multiplies filtering coefficients $\{h_0 \ldots h_M\}$ by a present carrier value and respective multiple delayed carrier values, and outputs a second error (Err') which adds the multiplied values, to thereby improve channel state estimation. In addition, the apparatus for direct measurement of the channel state of an OFDM receiver according to exemplary embodiments of the present invention may also include an adaptation unit 68, which estimates a correlation coefficient signal (S) of two (or more) adjacent carriers using a signal corresponding to an inverse number of the SMCFR, and outputs the filtering coefficients $\{h_0 \ldots h_M\}$ belonging to the filtering coefficient group selected according to the estimated correlation coefficient signal (S), thus enabling the apparatus to be adapted to a frequency selective channel or a mobile channel.

As described above, an apparatus for direct measurement of the channel state of an OFDM receiver according to exemplary embodiments of the present invention may adapt a frequency selective channel using a squared Euclidean distance between a received signal value and a de-mapped value for measurement of the channel state and more reliably estimate CSI, suitable for signal processing with co-channel interference. Because the estimated CSI may be used in a bit metric calculation of subsequent error correction decoders, such as a Viterbi decoder, system SNR gain may be increased. Also, because receiving equipment, such as digital televisions, etc., may receive DVB-T signals and perform image processing, clearer pictures with less distortion can be displayed, for example, on a digital television.

Although exemplary embodiments of the present invention are described in conjunction with OFDM signals and receivers, the teachings of the present invention are equally applicable to other signals and/or receivers, as would be known to one of ordinary skill in the art.

Although exemplary embodiments of the present invention are described as complying with ETSI standards, the teachings of the present invention are equally applicable to other standards, as would be known to one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for direct measurement of the channel state of an OFDM (Orthogonal Frequency Division Multiplexing) receiver comprising:

a de-mapping and pilot insertion unit which receives complex OFDM signals, performs de-mapping processing corresponding to data carriers, TPSC (Transmission Parameter Signaling Carriers) and one of CPC (Continual Pilot Carrier) and SPC (Scattered Pilot Carrier) of the complex OFDM signals, and outputs the de-mapped signals;

a subtraction unit which subtracts the complex OFDM signals from the de-mapped signals and outputs the subtracted values;

a squared Euclidean distance calculation unit which calculates a squared value of a signal for I (In-phase) and a squared value of a signal for Q (Quadrature) of output signals of the subtraction unit, and outputs a first error which is a sum of the squared values;

a non-recursive carrier filtering unit which delays the first error one carrier at a time, multiplies filtering coefficients by a present carrier value of the first error and multiple delayed carrier values, and outputs a second error which is a sum of the multiplied values;

a data carrier extraction unit which extracts and outputs an error corresponding to the data carrier from the second error;

a recursive symbol filtering unit which outputs a third error which averages the output error of the data carrier extraction unit and a previous symbol; and a quantization unit which receives the third error, inverts the third error with non-linear transfer function relation, and outputs a CSI (Channel State Information) signal including quantized multiple bits.

2. The apparatus of claim 1, further comprising a total delay line, which delays and outputs the complex OFDM signals as much as the delay of the non-recursive carrier filtering unit.

3. The apparatus of claim 1, further comprising an adaptation unit, which estimates a correlation coefficient signal of two adjacent carriers using a signal corresponding to an inverse number of an SMCFR (Squared Magnitude of the Channel Frequency Response) and outputs filtering coefficients belonging to a filtering coefficient group selected according to the estimated correlation coefficient signal.

4. The apparatus of claim 1, wherein the de-mapping and pilot insertion unit comprises:

a QAM (Quadrature Amplitude Modulation) de-mapper which de-maps and outputs values belonging to the data carrier according to a QAM format;

a BPSK (Binary Phase Shift Keying) de-mapper which de-maps and outputs values belonging to the TPSC according to a BPSK format; and a reference sequence generator which substitutes and outputs a sequence of real values for every carrier position corresponding to values belonging to at least one of the CPC and the SPC.

5. The apparatus of claim 1, wherein the subtraction unit comprises:

a first subtracter which subtracts and outputs the complex OFDM signal from a de-mapped signal of values belonging to the data carrier;

a second subtracter which subtracts and outputs the complex OFDM signal from a de-mapped signal of values belonging to the TPSC;

a third subtracter which subtracts and outputs the complex OFDM signal from a de-mapped signal of values belonging to one of the CPC and the SPC;

control logic which inputs a carrier number and a scattered pilot pattern signal, distinguishes the type of present carrier, and outputs a MUX control logic signal depending on whether the present carrier is the data carrier, the TPSC, or one of the CPC and the SPC; and a MUX which selectively outputs one of the first subtracter output signal, the second subtracter output signal, and the third subtracter output signal in response to the MUX control logic signal.

6. The apparatus of claim 1, wherein the squared Euclidean distance calculation unit comprises:
- an IQ signal selector which divides and outputs an output signal of the subtraction unit into a signal for I and a signal for Q;
- a first square calculator which calculates and outputs a squared value of a signal for I;
- a second square calculator which calculates and outputs a squared value of a signal for Q; and
- an adder which outputs a first error which is a sum of the squared values.

7. The apparatus of claim 1, wherein the non-recursive carrier filtering unit comprises:
- carrier delay lines which output delayed multiple carrier values by delaying the first error one carrier at a time;
- coefficient multipliers which multiply and output the filtering coefficients by the present carrier value of the first error and the delayed multiple carrier values; and
- adders which output a second error which is a sum of the squared values.

8. The apparatus of claim 1, wherein the recursive symbol filtering unit comprises:
- an adder which outputs the third error which adds an output error of the data carrier extraction unit and a first recursive value;
- a delay line which delays and outputs the third error by one symbol; and
- a multiplier which outputs the first recursive value as a product of a forgetting factor and an output symbol of the delay line.

9. The apparatus of claim 1, wherein the quantization unit comprises:
- comparators that compare the third error to reference levels which have an inverting and non-linear transfer function relation between the levels and the quantized number, output a second logic state if the reference levels are higher than the third error, and output a first logic state if the reference levels are not higher than the third error; and
- adders which add digital output values of the comparators and output a CSI signal of multiple bits.

10. The apparatus of claim 3, wherein the adaptation unit comprises:
- a correlation calculation unit which estimates and outputs a correlation coefficient signal of two adjacent carriers using a signal corresponding to an inverse number of the SMCFR; and
- a filter coefficient selection unit which outputs the filtering coefficients belonging to the filtering coefficient group selected according to the estimated correlation coefficient signal.

11. The apparatus of claim 10, wherein the correlation calculation unit comprises:
- a first filter which inputs a signal corresponding to an inverse number of the SMCFR, and calculates and outputs an average value of the signal and a previous carrier;
- a subtracter which subtracts and outputs the average value from an input signal corresponding to an inverse number of the SMCFR;
- a delay line which delays an output signal of the subtracter by one carrier and outputs an adjacent carrier;
- a multiplier which multiplies and outputs an output signal of the subtracter and the adjacent carrier; and
- a second filter which inputs an output signal of the multiplier, calculates an average value of the output signal and a previous carrier, and outputs the estimated correlation coefficient signal.

12. The apparatus of claim 11, wherein the first filter comprises:
- a first sub multiplier which multiplies and outputs a first time constant by a signal corresponding to an inverse number of the SMCFR;
- a first sub adder which adds and outputs an output signal of the first sub multiplier and a second recursive value;
- a first sub delay line which delays and outputs an output of the first sub adder by one carrier; and
- a second sub multiplier which outputs the second recursive value by multiplying a second time constant by an output carrier of the first sub delay line.

13. The apparatus of claim 11, wherein the second filter comprises:
- a second sub adder which outputs the estimated correlation coefficient signal by adding an output signal of the multiplier and a third recursive value;
- a second sub delay line which delays and outputs the estimated correlation coefficient signal with one carrier; and
- a third sub multiplier which outputs the third recursive value by multiplying a third time constant by an output carrier of the second sub delay line.

14. The apparatus of claim 10, wherein the filter coefficient selection unit comprises:
- a filter selector which selects the filtering coefficient group according to the estimated correlation coefficient signal; and
- a filter coefficients memory which stores filtering coefficients belonging to multiple filtering coefficient groups, and in response to the selection of a filtering coefficient group of the filter selector, outputs the filtering coefficients belonging to the selected filtering coefficient group.

15. A method of directly measuring the channel state of an OFDM receiver comprising:
- receiving complex OFDM signals, performing de-mapping corresponding to respective values belonging to data carriers, TPSC, and CPC or SPC of the complex OFDM signals, and outputting the de-mapped signals;
- subtracting the complex OFDM signals from the de-mapped signals, and outputting the subtracted values;
- calculating a squared Euclidean distance by calculating a squared value of a signal for I and a squared value of a signal for Q of output signals of the subtracting, and outputting a first error which is a sum of the squared values;
- filtering a non-recursive carrier by delaying the first error one carrier at a time, multiplying filtering coefficients by a present carrier value of the first error and multiple delayed carrier values, and outputting a second error which is a sum of the multiplied values;
- extracting a data carrier by extracting and outputting an error corresponding to the data carrier from the second error;
- filtering a recursive symbol by outputting a third error averaging the output error of the data carrier extracting step and a previous symbol; and
- quantizing by receiving the third error, inverting the third error with a non-linear transfer function relation, and outputting a CSI signal including quantized multiple bits.

16. The method of claim 15, further comprising delaying the complex OFDM signals as much as the delay in the non-recursive carrier filtering and output.

17. The method of claim 15, further comprising estimating a correlation coefficient signal of two adjacent carriers using a signal corresponding to an inverse number of an SMCFR, and outputting the filtering coefficients belonging to a filtering coefficient group selected according to the estimated correlation coefficient signal.

18. The method of claim 15, wherein the de-mapping comprises:
de-mapping a QAM by de-mapping and outputting values belonging to the data carrier according to a QAM format;
de-mapping a BPSK by dc-mapping and outputting values belonging to the TPSC according to a BPSK format; and
generating a reference sequence by substituting and outputting a sequence of real values at every carrier position corresponding to values belonging to one of the CPC and the SPC.

19. The method of claim 15, wherein the subtracting comprises:
first subtracting by subtracting and outputting the complex OFDM signal from a de-mapped signal of values belonging to the data carrier;
second subtracting by subtracting and outputting the complex OFDM signal from a de-mapped signal of values belonging to the TPSC;
third subtracting by subtracting and outputting the complex OFDM signal from a de-mapped signal of values belonging to one of the CPC and the SPC;
generating a control signal by inputting a carrier number and a scattered pilot pattern signal, determining the type of present carrier, and outputting MUX control logic signals depending on whether the present carrier is the data carrier, the TPSC, or one of the CPC and the SPC; and
multiplexing by selectively outputting one of an output signal of the first subtracting, an output signal of the second subtracting, and an output signal of the third subtracting in response to the MUX control logic signals.

20. The method of claim 15, wherein the squared Euclidean distance calculating comprises:
selecting an IQ signal by dividing and outputting the output signal of the subtracting into a signal for I and a signal for Q;
calculating a first square by calculating and outputting a squared value of a signal for I;
calculating a second square by calculating and outputting a squared value of a signal for Q; and
adding by outputting a first error which is a sum of the squared values.

21. The method of claim 15, wherein the non-recursive carrier filtering comprises:
delaying a carrier by outputting multiple delayed carrier values by delaying the first error one earner at a time;
multiplying a coefficient by multiplying and outputting the filtering coefficients by the present carrier value of the first error and the delayed multiple carrier values; and
adding by outputting a second error which is a sum of the squared values.

22. The method of claim 15, wherein the recursive symbol filtering comprises:
adding an output error of the data carrier extracting and a first recursive value to output the third error;
delaying and outputting the third error by one symbol; and
multiplying a forgetting factor by an output symbol of the delaying to output the first recursive value.

23. The method of claim 15, wherein the quantizing comprises
comparing the third error to reference levels having the inverting and non-linear transfer function relation between the levels and the quantized number, outputting a second logic state if the reference levels are higher than the third error, and outputting a first logic state if the reference levels are not higher than the third error; and
adding digital output values of the comparing and outputting to obtain a CSI signal with the multiple bits.

24. The method of claim 17, wherein the adapting comprises:
calculating a correlation by estimating and outputting a correlation coefficient signal of two adjacent carriers using a signal corresponding to an inverse number of the SMCFR; and
selecting a filter coefficient by outputting the filtering coefficients belonging to the filtering coefficient group selected according to the estimated correlation coefficient signal.

25. The method of claim 24, wherein the correlation calculating comprises:
first filtering by inputting a signal corresponding to an inverse number of the SMCFR, and calculating and outputting an average value of the signal and a previous carrier;
subtracting and outputting the average value from an input signal corresponding to an inverse number of the SMCFR;
delaying an output signal of the subtracting by one carrier and outputting an adjacent carrier;
multiplying and outputting an output signal of the subtracting and the adjacent carrier; and
second filtering by inputting an output signal of the multiplying, calculating an average value of the output signal and a previous carrier, and outputting the estimated correlation coefficient signal.

26. The method of claim 25, wherein the first filtering comprises:
first sub multiplying by multiplying and outputting a first time constant by a signal corresponding to an inverse number of the SMCFR;
first sub adding by adding and outputting an output signal of the first sub multiplier and a second recursive value;
first sub delaying by delaying and outputting an output of the first sub adding by one carrier; and
second sub multiplying by outputting the second recursive value which multiplies a second time constant by an output carrier of the first sub delaying.

27. The method of claim 25, wherein the second filtering comprises:
second sub adding by outputting the estimated correlation coefficient signal which adds an output signal of the multiplying and a third recursive value;
second sub delaying by delaying and outputting the estimated correlation coefficient signal with one carrier; and
third sub multiplying by outputting the third recursive value which multiplies a third time constant by an output carrier of the second sub delaying.

28. The method of claim 24, wherein the filter coefficient selecting comprises:
selecting a filter by selecting the filtering coefficient group according to the estimated correlation coefficient signal; and
outputting a filter coefficients memory by storing filtering coefficients belonging to respective multiple filtering coefficient groups, and in response to the selection of a filtering coefficient group of the filter selecting, outputting the filtering coefficients belonging to the selected filtering coefficient group.

* * * * *